Sept. 15, 1931. C. O. MATHIESON 1,823,207
COMBINATION LAND AN WATER VEHICLE
Filed July 3, 1930
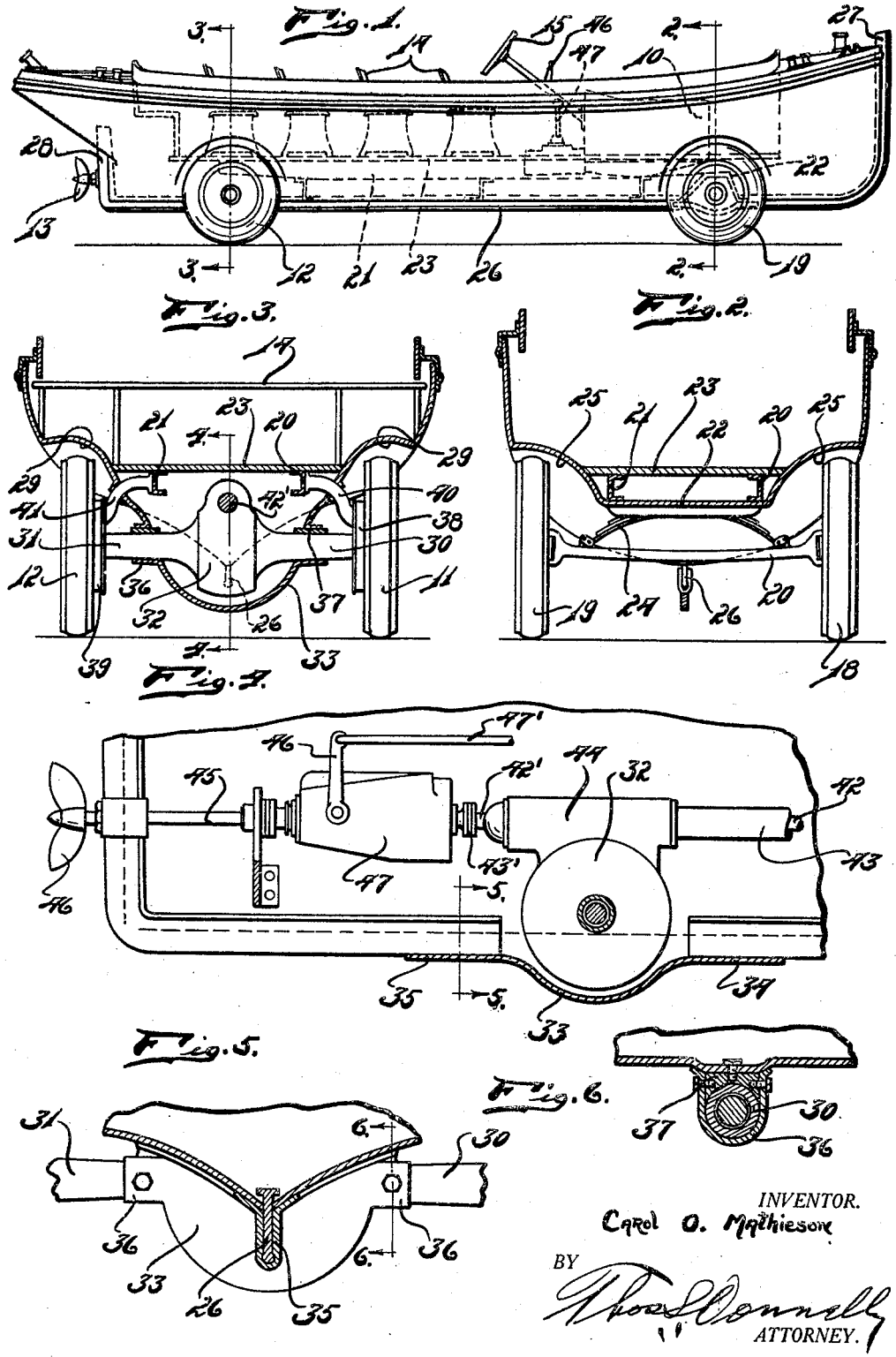
INVENTOR.
Carol O. Mathieson
BY
Thos. L. Donnell
ATTORNEY.

Patented Sept. 15, 1931

1,823,207

UNITED STATES PATENT OFFICE

CARL O. MATHIESON, OF HIGHLAND PARK, MICHIGAN

COMBINATION LAND AND WATER VEHICLE

Application filed July 3, 1930. Serial No. 465,464.

My invention relates to a new and useful improvement in a combination land and water vehicle adapted for being propelled on land or in water and capable of passing, under its own power, from the land into the water or from the water onto the land. It is an object of the present invention to provide a device of this class which will be simple in structure, economical of manufacture, durable, and highly efficient in use.

Another object of the invention is the provision of a device of this kind in which the propelling mechanism will be enclosed so that when the vehicle is being propelled through the water access of water to the propelling mechanism will be prevented.

Other objects will appear hereinafter.

The invention consists in the combination and arrangement of parts hereinafter described and claimed.

The invention will be best understood by a reference to the accompanying drawings which form a part of this specification and in which, Fig. 1 is a side elevational view of the invention.

Fig. 2 is a sectional view taken on line 2—2 of Fig. 1.

Fig. 3 is a sectional view taken on line 3—3 of Fig. 1.

Fig. 4 is a fragmentary view taken on line 4—4 of Fig. 3.

Fig. 5 is a view taken on line 5—5 of Fig. 4.

Fig. 6 is a view taken on line 6—6 of Fig. 5.

As shown in the drawings I provide a body simulating a boat in shape and appearance. A suitable motor 10, preferably of the internal combustion type, is mounted in the body and suitably connected for driving the rear traction wheels 11 and 12 and also for driving the propeller 13. Seats 14 are mounted in the body and a steering wheel 15 is accessible for steering the front traction wheels 18 and 19 which are carried on a front axle 20. The connection of the steering mechanism to the front wheels is the same as is ordinarily used in an automobile and the mounting of the front wheels on the axle 20 is of the conventional type used in automobiles. Extending longitudinally of the body are the chassis rails 20 and 21 which are positioned above the floor 22 of the body proper and below the auxiliary floor 23. The front axle 20 is connected by the spring 24 to the under surface of the body bottom 22, and the side walls of the body are recessed or pressed inwardly as at 25, to provide the space for the front traction wheels 18 and 19. Extending longitudinally of the body centrally of the bottom thereof is the keel bar 26 having the upwardly turned portion 27 at the bow and the upwardly turned portion 28 at the stern. The body is pressed inwardly to provide recesses 29 for actuating the rear traction wheels 11 and 12 which are suitably mounted on axles enclosed in the axle housings 30 and 31 which project outwardly from the rear axle gear housing 32 in which the differential is mounted.

As shown in Fig. 4 the keel bar 26 is interrupted at the rear axle gear housing 32 and an enclosing plate 33 which is formed substantially globe shaped is provided at its opposite ends with the U-shaped extensions 34 and 35 which project forwardly and rearwardly respectively, and are clamped about the keel bar 26. Lateral sleeve forming U-shaped extensions 36 extend outwardly from the enclosing plate 33 at opposite sides and embrace the rear axle housings 30 and 31. A wedge 37 is positioned in this U-shaped neck structure 36 to form a water proof connection about the periphery of the rear axle housings 30 and 31. With this mounting the mechanism which serves to propel the traction wheels is enclosed so that access of water thereto is prevented. Mounted stationary on the rear axle housings 30 and 31 are the drums 38 and 39 each connected to the chassis side rails 20 and 21 by the braces 40 and 41 respectively, which project through the side walls of the body sufficiently close to form a water tight connection.

Extending rearwardly from the motor 10 is the drive shaft 42 which is enclosed in the sheathing or housing 43 and projects into the rear axle gear housing 44 for driving the axles upon which the traction wheels 11 and 12 are mounted. This method of driving is the conventional type, well known and commonly used, in automobiles. The extension 42' on the shaft is connected by a coupling 43' with the shaft which extends into the transmission housing 47.

Suitable transmission is provided so that the shaft 45 may be rotated at will upon a locking of the lever 46. A rod 47' is connected to the lever 46 and extended to the forward end of the boat where it will be accessible to the operator. The shaft 45 extends through the rear end of the body in a water tight connection and is provided with the propeller 46 which is used to propel the vehicle through the water.

A gear shift lever 47 is provided for shifting the gears so that the shaft 42 may be caused to rotate, this gear shift lever being of a conventional and well known type and cooperating with a suitable clutch pedal and mechanism.

In operation when the motor 10 is started and the mechanism placed in gear to drive the shaft 42 the wheels 11 and 12 will be rotated and upon a proper operation of the lever 46 the shaft 45 may also be set into rotation. While the vehicle is being propelled over the land, the propeller 46, of course, would not be rotated but while the vehicle is being propelled through the water the wheels 11 and 12 will be rotating as well as the propeller 46, the purpose of this arrangement is so that when the vehicle gradually moved onto the land the traction wheels and the propeller will cooperate and when the vehicle has been driven from the water onto the land the propeller 46 may be thrown out of gear. In this way there is no necessity of shifting the operating mechanism as the land itself is contacted with and the likelihood of becoming mired through remaining stationary while the shift is made is eliminated. The front wheels are capable of being angularly turned for steering purposes both on land and in water.

While I have illustrated and described the preferred form of my invention, I do not wish to limit myself to the precise details of structure shown, but desire to avail myself of such variations and modifications as may come within the scope of the appended claims.

Having thus described my invention, what I claim is new and desire to secure by Letters Patent is:

1. In a device of the class described: a body; a keel bar extending longitudinally of said body; a gear box mounted in said body and projecting below said keel bar; an enclosing plate for enclosing said gear box, said enclosing plate being doubled upon itself and clamped on said keel bar for forming a water tight connection.

2. In a device of the class described: a body; a keel bar extending longitudinally of said body; a gear box mounted in said body and projecting below said keel bar; an enclosing plate for enclosing said gear box, said enclosing plate being doubled upon itself and clamped on said keel bar for forming a water tight connection; axles projecting outwardly from the interior of said body at opposite sides thereof; a neck at opposite sides of said plate for embracing said axle and forming a water tight connection thereon.

3. In a device of the class described: a body; a keel bar extending longitudinally of said body; a gear box mounted in said body and projecting below said keel bar; an enclosing plate for enclosing said gear box, said enclosing plate being doubled upon itself and clamped on said keel bar for forming a water tight connection; axles projecting outwardly from the interior of said body at opposite sides thereof; a neck at opposite sides of said plate for embracing said axle and forming a water tight connection thereon; and a wedge block co-operating with said necks for clamping the axle in fixed relation to said body.

In testimony whereof I have signed the foregoing specification.

CARL O. MATHIESON.